United States Patent [19]

Ward

[11] Patent Number: 4,503,724
[45] Date of Patent: Mar. 12, 1985

[54] POWER TRANSMISSION UNIT WITH OSCILLATING DRIVE AND DRIVEN MEMBERS

[76] Inventor: Russell G. Ward, 2050 SW. 71st Ave., Portland, Oreg. 97225

[21] Appl. No.: 351,878

[22] Filed: Feb. 24, 1982

[51] Int. Cl.³ .................. F16H 27/02; B62M 1/14; G10K 11/00; F16D 41/04
[52] U.S. Cl. ............................... 74/143; 74/142; 74/571 R; 280/242 WC; 180/205; 192/48.92
[58] Field of Search ............... 74/143, 142, 126, 133, 74/134, 158, 96, 837, 570, 571 R, 48; 280/242 WC, 244, 246, 252, 253, 255; 180/205, 207, 6.5, DIG. 3; 192/48.92, 48.9, 46

[56] References Cited

U.S. PATENT DOCUMENTS

| | | | |
|---|---|---|---|
| 390,174 | 9/1888 | Lambert | 74/143 |
| 413,104 | 10/1889 | Saxton | 280/246 |
| 483,881 | 10/1892 | Coughnet | 74/48 |
| 641,313 | 1/1900 | Martin | 74/142 |
| 806,138 | 12/1905 | Haskitt | 74/570 |
| 810,780 | 1/1906 | Lorenc | 74/143 |
| 847,807 | 3/1907 | Ogborn | 74/134 |
| 1,097,571 | 5/1914 | Thurlow | 74/134 |
| 1,827,973 | 10/1931 | Dezendorf | 74/600 |
| 2,412,222 | 12/1946 | Kessler | 74/48 |
| 2,621,395 | 12/1952 | Miller | 74/96 |
| 2,643,898 | 6/1953 | Everest et al. | 280/242 WC |
| 2,770,089 | 11/1956 | Feuerlein | 74/48 |
| 2,791,122 | 5/1957 | Momberg | 74/600 |
| 2,798,565 | 7/1957 | Rosenthal et al. | 180/DIG. 3 |
| 2,838,966 | 6/1958 | Schneider | 74/600 |
| 3,100,547 | 8/1963 | Rosenthal | 180/6.5 |
| 3,212,610 | 10/1965 | Walker et al. | 192/46 |
| 3,309,110 | 3/1967 | Bulmer | 74/143 |
| 3,351,148 | 11/1967 | Solomon | 180/6.5 |
| 3,376,944 | 4/1968 | Lotz | 180/6.5 |
| 3,407,628 | 10/1968 | Eccher | 74/69 |
| 3,877,725 | 4/1975 | Barroza | 280/242 WC |
| 3,896,891 | 7/1975 | Miltenburg et al. | 180/DIG. 3 |
| 3,994,509 | 11/1976 | Schaeffer | 280/242 WC |
| 4,274,651 | 6/1981 | Dumont | 280/242 WC |
| 4,358,126 | 11/1982 | Mitchell et al. | 280/242 WC |
| 4,422,515 | 12/1983 | Loveless | 280/242 WC |

FOREIGN PATENT DOCUMENTS

| | | | |
|---|---|---|---|
| 653622 | 12/1962 | Canada | 180/6.5 |
| 0114148 | 5/1978 | Japan | 180/DIG. 3 |

Primary Examiner—Leslie A. Braun
Assistant Examiner—Michael J. Gonet
Attorney, Agent, or Firm—James D. Givnan, Jr.

[57] ABSTRACT

A power transmission unit with a power input lever which oscillates about a first axis. A driven member of the transmission unit oscillates about a second axis, parallel to the first axis, embodied within a rockshaft. The range of arcuate travel imparted to the rockshaft is determined by the proximity of a drive pin coupling a lever carried drive member to a driven member carried by the rockshaft. An oscillating sector gear on the rockshaft drives a spur gear which, in turn, drives ratchet teeth equipped ring gear means. The gear means cooperate with pawl means on an output shaft to rotate the shaft in a unidirectional, incremental manner.

7 Claims, 7 Drawing Figures

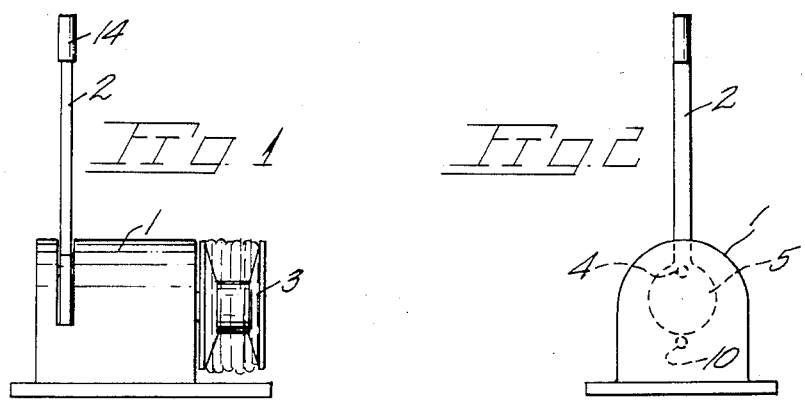
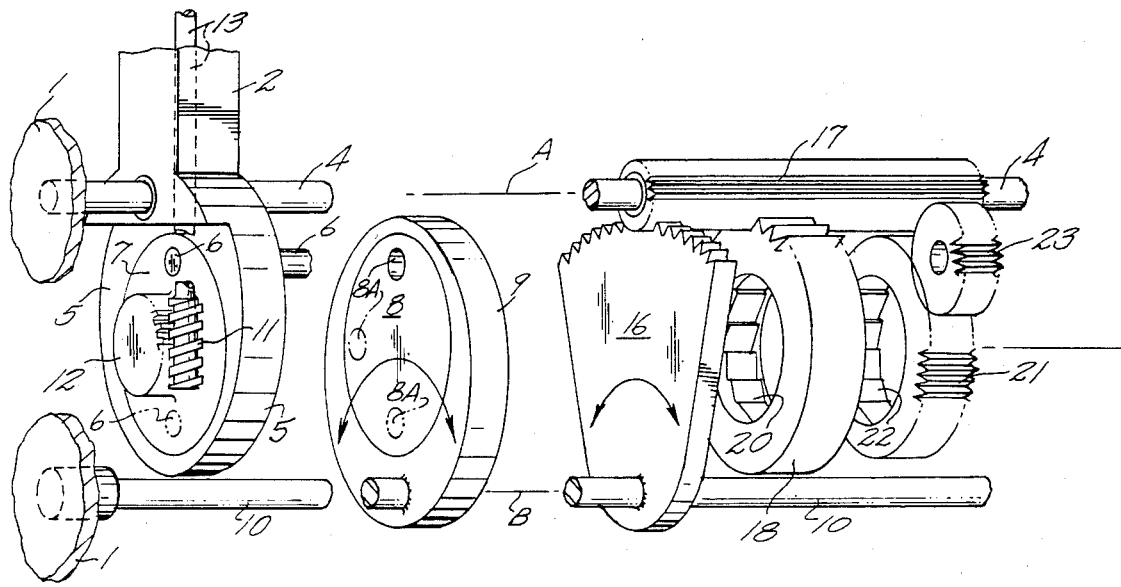
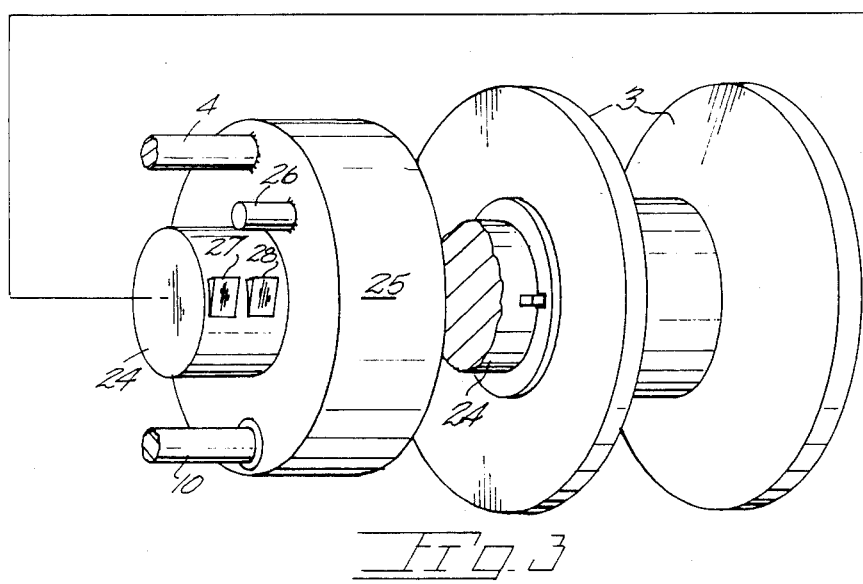

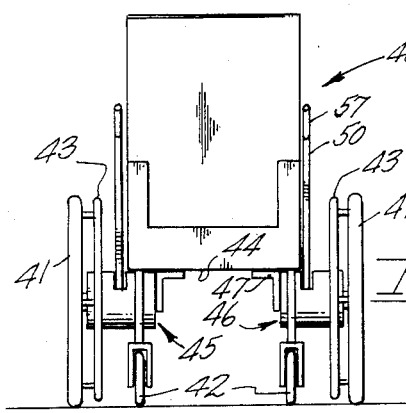
Fig. 4
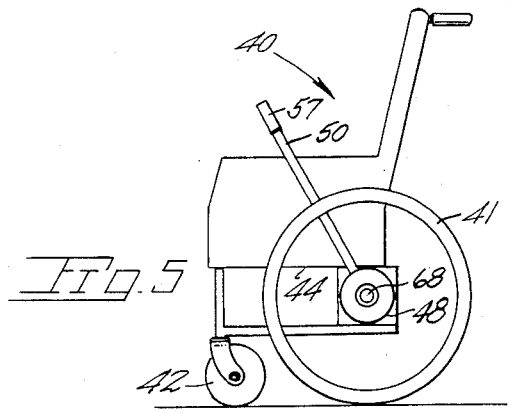
Fig. 5
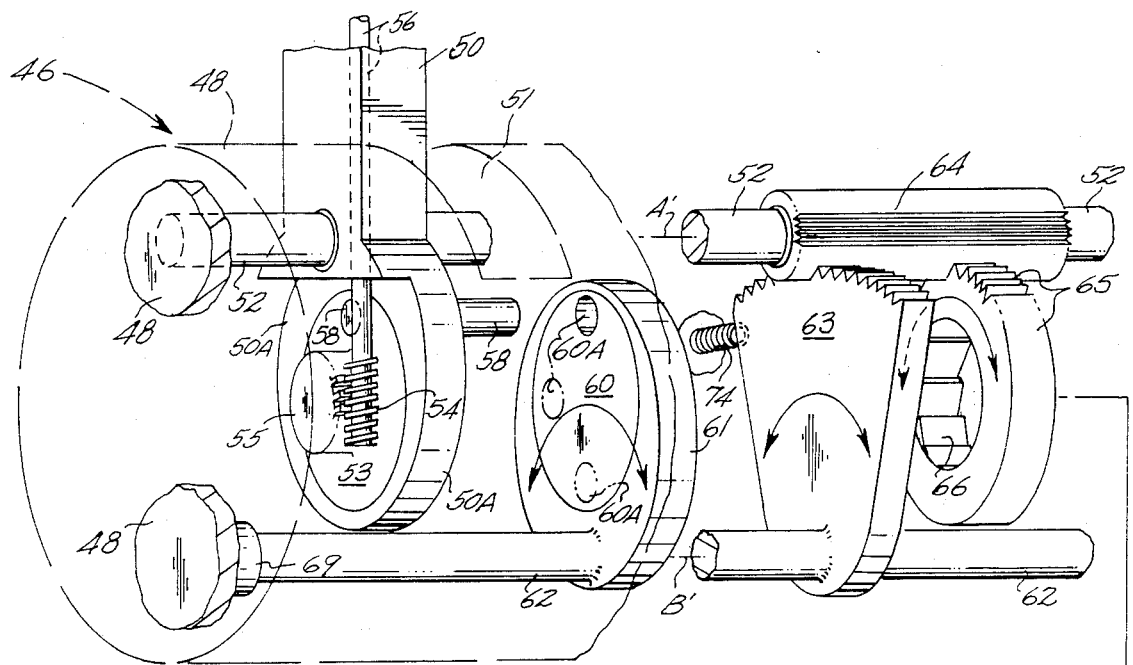
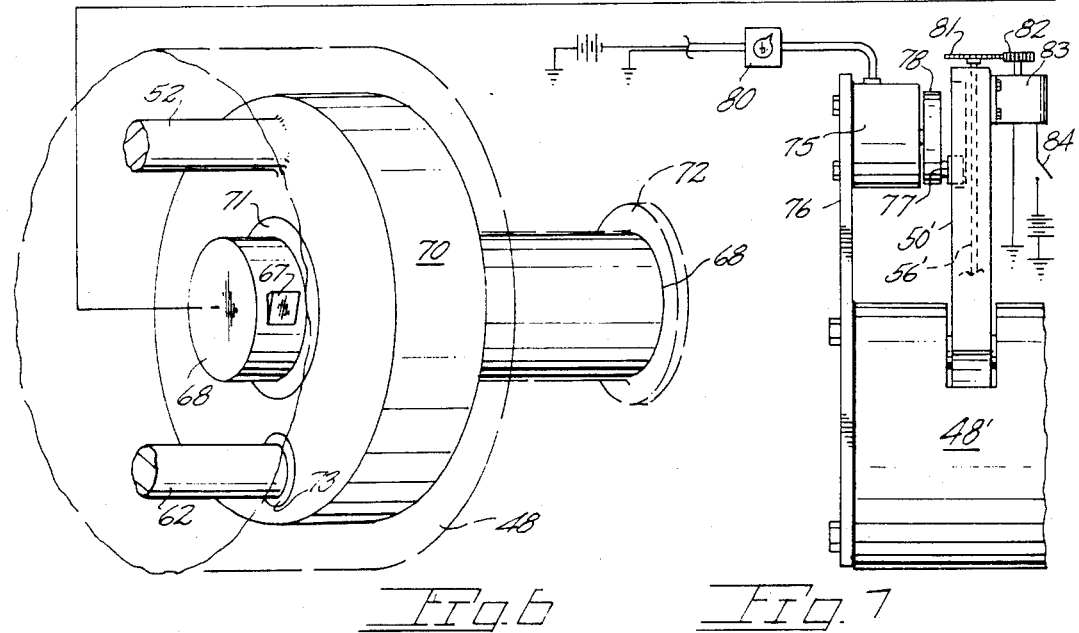
Fig. 6
Fig. 7

POWER TRANSMISSION UNIT WITH OSCILLATING DRIVE AND DRIVEN MEMBERS

BACKGROUND OF THE INVENTION

The present invention concerns power transmission units and particularly a unit covering oscillating motion to incremental, unidirectional rotary motion.

Typical variable speed transmissions utilize complicated series of drive components such as gears of a gear train, V-belts and sheaves, etc., such being of considerable size and weight and of costly manufacture. A further drawback of such transmissions is that they do not lend themselves to converting lever motion to rotary motion. Known transmission units do not lend themselves for use with human powered systems such as used in winches, wheelchairs, small boats, etc., where power input is oscillation motion.

Further, speed changes in known transmissions require an interruption in the power output of the transmission and incur somewhat complex shifting and synchronizing mechanisms.

SUMMARY OF THE PRESENT INVENTION

The present invention is embodied in a transmission utilizing a multiple fulcrum arrangement which drives an oscillating shaft and sector gear with a ratchet type final drive delivering unidirectional rotation to an output shaft in incremental fashion.

The present transmission unit may be embodied in a winch or other instrumentality lending itself to powering by reciprocal arm or leg motion. A modified form of the invention lends itself to use in the powering of a wheelchair by arm motion. In one form of the invention input power is converted from rotational to reciprocal by use of known motion translating mechanisms.

A swingably mounted lever carries a first drive member or driving disk which rocks about the axis of a supporting shaft constituting a first fulcrum. A second or driven member is carried by a second shaft termed a rockshaft. The two members jointly carry a positionable fulcrum pin which is positionable relative the driven second shaft to vary the leverage and range of arcuate travel imparted to the rockshaft. The rocking motion of the rockshaft imparts like motion to a sector gear carried thereby which in turn drives ring gears and a ratchet drive assembly which imparts unidirectional rotation to a winch sheave or other instrumentality.

A modified form of the present transmission unit is suited for incorporation into a wheelchair to provide a lever driven power transmission unit greatly facilitating wheelchair operation.

In both forms of the transmission speed selector means are incorporated enabling the operator to select the desired relationship between a power input member shown as a lever and a rotary output member. The term speed selector means is intended to by synonomous with means for changing mechanical advantage.

Important objectives of the transmission unit include the provision of a compact unit for translating continuous lever motion into rotary motion of an output member with the capability of infinite speed or mechanical advantage changes; the provision of a transmission unit wherein motion is imparted to a driven rockshaft the arcuate travel of which, and a sector gear thereon, is determined by the location of a positionable fulcrum jointly carried by drive and driven members; the provision of a transmission unit wherein a speed selector is conveniently disposed on a lever to permit speed changes without interruption of power delivery to an output shaft; the provision of a transmission for use in wheelchairs which permits "free wheeling" of the wheelchair when moved readwardly.

BRIEF DESCRIPTION OF THE DRAWINGS

In the accompanying drawings:

FIG. 1 is a front elevational view of a winch incorporating the present transmission system;

FIG. 2 is a left side elevational view of FIG. 1;

FIG. 3 is an exploded view of a preferred embodiment of the transmission;

FIG. 4 is a front elevational view of a wheelchair with the present transmission in place thereon;

FIG. 5 is a right side elevational view of FIG. 4;

FIG. 6 is an exploded view of the wheelchair power transmission unit; and

FIG. 7 is a fragmentary side elevational view of a modified transmission unit wherein the lever and speed selector are motor driven.

DETAILED DESCRIPTION OF THE PREFERRED EMBODIMENTS

With continuing reference to the drawings, the reference numeral 1 indicates a winch housing enclosing the present transmission with the exception of a lever 2 and a driven sheave member 3.

Lever 2 is swingably mounted for motion about the axis A of a fixed shaft 4 suitably mounted within housing 1 with the enlarged lever end at 5 constituting a drive member. Drive means shown as a pin at 6 is carried by a rotatable drive disk 7. The pin distal end is journaled at 8A within a driven disk 8 rotatably carried within a driven member 9. Member 9 is fixedly mounted on rockshaft 10 having an axis at B. Accordingly, oscillatory lever motion results in drive member 5 rocking about the axis A of support shaft 4 and imparting rocking motion to driven member 9 via pin drive means 6. Simultaneously, disk members 7 and 8 additionally rotate arcuately about their own axes as they rock respectively about axis A and axis B.

For purposes of altering the relationship between the travel of lever 2 and the arcuate travel of driven rockshaft 10 a speed control mechanism is provided which includes a worm gear 11 engaged with a pinion gear 12 on disk 7. A worm gear control shaft 13 is coupled to a control at 14 to permit the operator to rotate pinion gear 12 and thereby position drive pin 6 about the axis of drive disk 7. The arcuate positioning of pin 6 toward or away from axis A of shaft 4 will determine the degree of travel or throw imparted to driven member 9 and also the magnitude of the arc through which a sector gear at 16 will travel during travel of lever 2 in one direction. A rockshaft axis is at B.

In mesh with sector gear 16 is additional gear means including a spur gear 17 journaled on fixed shaft 4 and which imparts rotation to a ring gear 18 having a series of internal ratchet teeth 20 disposed about its inner periphery. A second ring gear 21 is similarly provided with ratchet teeth at 22 about its inner periphery but is driven by an idler gear 23 also in mesh with gear 17. Ratchet teeth equipped ring gears 18 and 21 are carried in a rotatable manner on an axle or output shaft 24 suitably journaled in a bearing block 25 at one end of housing 1. Axle 24 extends outwardly of the housing to receive in a keyed manner sheave 3 on which a length of cable or the like is wound. Bearing block 25 serves to additionally carry the ends of fixed shaft 4 and rockshaft 10 as well as spindle 26 for idler gear 23.

Cooperating respectively with the ratchet means on ring gears 18 and 21 are spring biased pawls 27 and 28 on sheave axle 24. From the foregoing it will be seen that gear 17 will impart rotation in opposite directions to ratchet teeth equipped ring gears 18 and 21 with said gears alternately driving sheave axle 24 in one direction. Travel of lever 2 in one direction will cause ring gear 18, ratchet teeth 20 and pawl 27 to impart rotation to sheave 3. Return travel of lever 2 in the opposite direction will cause ring gear 21, ratchet teeth 22 and pawl 28 to impart like rotation to sheave 3 resulting in the sheave being rotated in a unidirectional manner with momentary stops coincident with the extremes of lever travel.

With attention now to the modified form of the invention shown in FIGS. 4 through 6, a wheelchair generally indicated at 40 is intended to be only exemplary of the uses of the present transmission. The wheelchair is essentially of conventional construction having main wheels 41 and caster wheels 42. Foot rests are not shown for purposes of illustration of the invention. Hand wheels at 43 are suitably attached to wheels 41.

A bottom wall 44 of the wheelchair seat serves to support transmission units indicated generally at 45 and 46 one of which will be described in detail in view of the units being substantially identical.

Transmission unit 46 is bracket mounted at 47 to the seat underside at one side of the chair and includes a housing 48 (FIG. 6) from which a lever 50 extends through an opening 51 in said housing. Said lever is rockably mounted on a fixed shaft 52 which extends lengthwise of the housing. An enlarged lever end at 50A constitutes a drive member and carries a drive disk member 53 which is rotatably positionable within the enlarged lever end by means of a speed control mechanism including a worm gear 54, a pinion gear 55 (integral with disk member 53) and a control rod 56 terminating upwardly in a hand actuated control 57 at the top end of lever 50.

Drive means at 58, in the form of a drive pin, is carried by drive disk member 53 and projects therefrom for rotatable engagement at 60A with a driven disk member at 60. The latter disk member is journaled within a driven member at 61 in place on a rockshaft 62. From this it will be seen that arcuate travel of lever 50 about shaft axis A' imparts oscillating motion via the disk members 53 and 60 to rockshaft 62 with the throw of the rockshaft about its axis B' determined by the proximity of positionable drive pin 58 to rockshaft 62, e.g., the closer the pin to rockshaft 62 the greater the throw or oscillating range of the rockshaft. Setting of drive pin 58 is by selective positioning of the pin by the foregoing speed control mechanism. Gear means includes an oscillating sector gear at 63 in place on the rockshaft which gear oscillates to impart rocking motion to a spur gear 64, journaled on support shaft 52. Spur gear 64 in turn drives a ring gear 65 on which ratchet teeth at 66 are formed on the inner periphery. A cooperating spring biased pawl at 67 is in place on a driven wheel axle or output shaft at 68. Gear 65 is journaled on the pawl equipped end of the wheel axle and drivingly engages the pawl in one direction of rotation for driving of the axle mounted wheel. A bearing block at 70 closes the outer end of transmission unit housing 48 and is suitably equpped with an internal bearing 71 for axle 68. In place on the axle for driven rotation therewith is a wheel hub 72 drawn in phantom lines. Hub 72 is keyed or otherwise secured to the axle. Fixed shaft 52 is supported by the bearing block while the corresponding end of rockshaft 62 is journaled within a bushing 73 in the bearing block and a boss 69 on housing 48.

Rotary motion is imparted to the wheel hub 72 in one direction during the power stroke of the lever in one direction. During the return stroke of the lever, sector gear 63 will swing in an opposite direction to drive gear 64 and meshed ratchet teeth equipped gear 65 in a reverse direction to cause ratchet teeth 66 to slide past pawl 67. Due to wheelchair inertia the axle 68 and pawl 67 thereon will continue to rotate but oppositely to that of gear 65 during the return stroke of the lever.

Important to wheelchair operation is chair capability to travel rearwardly in a free wheeling manner in which instance axle 68 drives, via pawl 67, ratchet teeth equipped gear 65 which in turn drives spur gear 64 and sector gear 63 the latter to an extreme position out of mesh with spur gear 54. A resilient member 74 biases the sector gear and accordingly acts to reengage the sector gear with the spur gear upon either (1) the reversal of rotation of the spur gear (wheelchair now again moving forwardly) or (2) a rotational force is imparted to the sector gear by rockshaft 62 at the start of normal transmission operation.

In transmission unit 45 the direction of ratchet teeth 66 and pawl 67 would be reversed from that shown in transmission unit 46 for desired powered wheel rotation.

The direction of the power stroke of the transmission levers may be reversed, if desired, by the addition of an idler gear intermediate spur gear 64 and ring gear 65 of each transmission unit.

In FIG. 7, I show still another form of the invention wherein prime reference numerals identify parts corresponding to those part identified immediately above by like reference numerals. A motor drive lever 50' extends outwardly from a transmission housing 48'. An electric motor at 75 is of the gearhead type and mounted on a backet 76 in place on the transmission housing. A roller cam 77 is carried eccentrically on a cam plate 78 the latter mounted on a motor output shaft. Cam 77 rides within a raceway formed lengthwise in lever 50' to impart oscillatory motion to the lever. A motor rheostat control at 80 permits motor speed to be regulated and hence the speed of lever 50'.

A speed control mechanism of the motor driven transmission is as earlier described and includes a control shaft 56' which terminates upwardly to receive a gear 81 with which is enmeshed a gear 82 on the output shaft of a reversible, electric servo motor 83 which is mounted in place on lever 59' and controlled by an appropriate switch control 89. Momentary motor operation drives control shaft 56' in an incremental manner to operate the remainder of the speed control mechanism to position a drive pin (not shown) relative a rockshaft in the transmission housing and hence vary the oscillating range of travel of said rockshaft in the manner described in the earlier forms of the transmission.

The present transmission unit is, as aforesaid, particularly applicable with minor modification to various human powered drive means such as for use in small boats and vehicles for example where reciprocable limb motion is physiologically preferred to rotary limb motion. The transmission lends itself to embodiment within a lightweight, compact unit of relatively few parts contributing to low manufacturing cost.

In use, the transmission unit shown in FIGS. 1–3 imparts powered rotation to sheave 3 with each stroke of lever 2. Positioning of drive pin 6 as shown in full lines in FIG. 3 results in minimum sheave rotation with each stroke of lever 2 providing a high mechanical advantage for heavy winch loads while locating of said pin to the double dot broken line position effects greatest sheave rotation for each lever stroke as when a light load is to be moved by a sheave wound cable or line.

The modified transmission unit of FIGS. 4–6 permit a wheelchair occupant to traverse inclined pathways otherwise not possible with a conventional unpowered wheelchair. Steering of the wheelchair is by differential lever speeds. Rearward travel of the wheelchair is by conventional use of the hand wheels 43 or by an attendant.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A power transmission unit for converting oscillating motion to rotary motion and comprising, a drive member, powered lever means for imparting oscillatory arcuate movement to said drive member for powered travel thereof about a first fixed axis constituting a primary fulcrum, a driven member adapted for oscillatory arcuate movement about a second fixed axis in parallel spaced relationship to said first axis, said drive member and said driven member each including a disk journaled therein, drive means coupling the disk of said drive member to the disk of said driven member and acting as a secondary fulcrum, oscillating gear means coupled to said driven member, ratchet means driven by said gear means, and an output shaft driven by said ratchet means in a unidirectional incemental manner.

2. The power transmission unit claimed in claim 1 wherein said powered lever means is motor driven.

3. The power transmission unit claimed in claim 1 or 2 additionally including a speed control mechanism including a worm gear, a pinion gear and a control shaft operable to position said drive means with respect to said first and second fixed axes so as to vary the magnitude of arcuate travel imparted to said driven member by said drive member whereby the acruate travel of said output shaft may be varied relative the travel of said powered lever means.

4. The power transmission unit claimed in claim 3 additionally including a rockshaft coaxial with said second fixed axis and on which said driven member is carried, said gear means including a sector gear on said rockshaft, a spur gear driven by said sector gear and a ring gear in mesh with said spur gear, said ring gear carried by said output shaft.

5. The power transmission unit claimed in claim 4 wherein said ratchet means includes ratchet teeth formed about an internal periphery of said ring gear, said ratchet means additionally including at least one pawl in place on said output shaft.

6. The power transmission unit claimed in claim 5 wherein said gear means additionally includes a second ring gear in place on said output shaft, ratchet teeth formed about the inner periphery of said second ring gear, an idler gear in mesh with said spur gear and said second ring gear, said ratchet means additionally including a second pawl in place on said output shaft and engageable with the ratchet teeth on said second ring gear whereby incremental unidirectional rotation is imparted to said output shaft during driven rotation of the spur gear in both directions by said sector gear.

7. The power transmission unit claimed in claim 5 additionally including resilient means biasing said sector gear toward engagement with said spur gear upon said sector gear reaching its limit of travel in one direction.

* * * * *